3,373,040
PRODUCTION OF MALT LIQUOR PRODUCTS HAVING VERY LOW PROTEIN, SUGAR AND REAL EXTRACT CONTENTS WITH DISTINCTIVE VINOUS FLAVOR
Charles Gluek, R.R. 5, Wayzata, Minn. 55391
No Drawing. Filed Jan. 8, 1965, Ser. No. 424,204
2 Claims. (Cl. 99—31)

ABSTRACT OF THE DISCLOSURE

Process for producing a malt liquor which comprises preparing a cooker mash and a main malt mash separately, withdrawing from the main mash a quantity of infusion liquid, mixing the main mash and the hot cooker mash, drawing off the wort from the mixed mash and boiling the wort and adding hops, fermenting the boiled wort during which withdrawn infusion liquid is added to the wort, adding to the fermented wort brewing water of pH 4.3 to obtain a beverage having 3.5% and 5% alcohol by volume, with a saccharometer indication by plato of less than 0.6%, a real extract content of less than 3.3 and a protein content of less than 3.8.

This invention relates to a novel, large scale, and highly economical production of a distinctive, new malt liquor brewed and fermented from essentially cereal products such as grains, rice, corn, grits, etc.

My present discoveries could well be classified as improvements and developments upon the processes and products disclosed in United States Letters Patent No. 2,442,806, issued June 8, 1948.

The product of said patented process has received favorable public acceptance and comprises very thin malt liquor of relatively high alcoholic content (usually from 6 to 9% by weight), having a very different and distinctive analysis and flavor as compared to any malt beverages or liquors previously known. Said malt liquor has exceedingly low real extract, protein content and sugar content by plato, and the flavor and aroma is quite vinous. Said process utilizes to fullest advantage the natural ingredients, including all starches, proteins dextrines and albumins, together with the various enzymes developed during the initial brewing, and including maltase, diastase and the various proteinases. The complete patented process, including the use of the brewing process, requires long and intense fermentation periods, thereby increasing the cost of manufacture of the product substantially beyond the cost of production of corresponding quantities of beer and ale.

It has been an object of my present invention to discover a process for very economically producing a thin malt liquor of the distinctive flavor and taste characteristics and specific types of alcohol produced by said patented process, but wherein real extract and protein content are even lower than in the product of said patent, with sugar content by plato as low, and wherein the alcoholic content may be reduced within a variation from 3.2 to 5% by weight, without detracting from the zestful and stimulating flavor of the original product.

Many attempts have been made to obtain substantially the distinctive malt liquor of the patented process with reduced alcoholic content, by lessening intensity of fermentation and by slightly altering some of the steps of said process. Such attempts and the experiments carried out have been wholly unsuccessful in producing any malt liquor having alcoholic content by weight between 3.2 and 5% which had a comparable analysis to the product of the patented process or which had the distinctive flavor characteristics of the product of the patent.

In the patented process, utilizing the recited infusion liquids as disclosed and with maintenance of pH values and the fermentation conditions and requirements of the patent, a production of dextrose before fermentation through conversion of dextrines and probably inversion of sucrose, and I have sound reason to believe, ultimately with fermentation, produces specific alcohols more nearly like those produced in the manufacture of wines and brandies, and which are not developed in other brewing processes where malt cereal ingredients are employed as the source. Also, I am convinced that flavor-producing esters in the complete patented process are produced with the pH values of the liquids during the several steps. Said esters are also thought to be important in the production of the zestful vinous flavor and aroma of the product. After exhaustive research, I have recently discovered that by application of certain product-extender steps to the relatively high alcoholic products of said Patent 2,442,806, carried out after full fermentation and preferably cooling of the original product, my essential object has been accomplished.

In other words, through the employment of my newly discovered product-extender steps, I am able to obtain a distinctive malt liquor having substantially all of the characteristics and advantages as well as flavor and taste characteristics of the original product, with reduction of alcoholic content down to as low as 3.2 by weight.

On analysis my new product shows even a decrease in the real extract and protein content without increase in plato. The flavor and zestful taste and aroma is not changed or modified and 300 barrels of my new lower alcoholic content product can be manufactured at a cost less than 15% above the cost of the manufacture of 150 barrels of the original product.

Success of my novel improvement process and production of my distinctive, economical malt liquor product requires the carrying out as part of my process, of all the essential steps of said patented process, to wit:

*Cereal mash mixture.*—Cereal such as rice or refined grits and a smaller quantity of malt (preferably brewers' malt, ground) are admixed with about 36 barrels of water (preferably hardened and acidified to a pH value approximating 5.3). For example, with said quantity of water 2600 pounds of refined grits with 1200 pounds of ground malt are employed.

*Cooker mash operation.*—The watered cereal mash mixture is heated to a temperature of about 30 degrees R., and held there for approximately 60 minutes. This initial heating of the cereal mash mixture produces digestion and extraction of soluble proteins and enzymes, particularly the alpha-amylase component of diastase. After said 60 minute period of heating, additional heat is applied for about 15 minutes to raise the temperature of the mash to about 50 degrees R., to cause the alpha-amylase component to begin its action on the starches of the malt and grits. Heating is continued for about 30 minutes to raise the temperature of the watered mash to some point about 54 degrees R., and preferably not over 58 degrees R. This is the optimum range of temperature for conversion of starches through action of the starch-liquefying enzymes present, chiefly the alpha-amylase component of diastase. Thereafter, through more application of heat, during a 20-minute period, the temperature is gradually raised to the boiling point 80 degrees R., and held there for 60 minutes. At the end of 30 minutes of boiling, the cereal mash is slowly dropped into the main mash which has been simultaneously prepared and is utilized at that point to raise the temperature of the main mash, as will hereinafter be more fully described. The said cooker mash operation will quite clearly liquefy the starches of the cereal ingredients before they are added to the main mash.

*Main mash operations.*—Simultaneously with the aforesaid cooker mash operation, a large amount (preferably approximately 4000 pounds) of distillers' malt and an equal or slightly larger amount of brewers' malt (finely ground) are mixed in the main mash tun with approximately 100 barrels of brewing water having a pH value of about 5.3. This mixture is digested to expressly extract the soluble proteins and the albuminoids which are mainly coagulable and which will later form a good break in the subsequent kettle operation. This watered mash is digested at a temperature of 30 degrees R., for a period of about 90 minutes whereafter additional heat is employed to gradually raise the temperature of the mixture to 42 degrees R., and the mixture is held there for approximately 25 minutes. This action causes conversion of the proteins by the appropriate enzymes present in the mash, such as proteinase and also, causes partial conversion of non-coagulable albuminoids into a coagulable state and in some instances, brings some of the albuminoids into solution.

It is very important to the success of this method that at said temperature of 42 degrees R., and maintenance thereof for several minutes, a thin liquid (hereafter referred to as "infusion" liquid) be withdrawn from the mixture or watered mash. From 0.3% to 0.5% of the total barrels to be brewed (preferably about 0.4%) of the thin infusion liquid is withdrawn, equalling approximately 22 gallons, if the foregoing proportions of ingredients of this example, are used. This withdrawn infusion liquid is exceedingly rich in enzymes, containing a large amount of carbohydrases including maltase and diastase and containing also a large amount of the proteinases. Said withdrawn infusion liquid is kept cool at a sufficiently low temperature to prevent infection thereof by bacteria.

*Cooker mash added to main mash.*—After withdrawal of said infusion liquid, the cereal or cooker mash at its boiling temperature, is slowly added to the main mash, requiring preferably about 30 minutes time. This addition of the cooker mash of course raises the temperature of the resultant mash mixture and the addition is preferably controlled to raise the temperature of the resultant mash mixture to about 52 degrees R., which temperature is preferably maintained for an additional 30 minutes for complete liquefication of starches. Thereafter, additional heat is applied to raise the temperature of the mash mixture in a short period of time, about 5 minutes, to a range between 54 degrees R., and 56 degrees R., and such temperature is held for a period of about 30 minutes to obtain a thorough saccharification of the starches, mainly through the beta-amylase component of the diastase. At this point an iodine test should be substantially neutral. Thereafter, the temperature is quickly raised in about 5 minutes to a temperature approximating 58 degrees R., and the mixture maintained at such point for about 15 minutes. The mixture is then mashed off to convert all remaining starches.

From the foregoing, it will be noted that the total time period for said mashing operation is substantially longer than that utilized in almost all known brewing processes and that *five different* temperature steps are employed.

*Kettle operation.*—The wort is filtered off from the mash tun and run into the kettle in conventional manner, and immediately thereafter a substantial quantity of the enzyme-rich infusion liquid, preferably from 24 to 26% of the total withdrawn, is added to the first wort, the temperature of the mixture then being within a range preferably between 52 degrees R., and 58 degrees R. The enzymes contained in this infusion liquid quickly act upon the non-fermentable and difficultly fermentable sugars and dextrines, converting them to a very substantial extent into sugars which are capable of fermentation. Preferably the kettle is not otherwise heated to high temperatures until after 75% of the first wort has been drawn off from the mash tun into the kettle. Thereafter, steam is turned on and the kettle is slowly brought to the boiling point of 80 degrees R., and then boiled with the remainder of the wort for an adequate period of time, preferably equivalent to 4 hours at atmospheric pressure. During the boiling, hops are added in the usual manner and brewing sugar (cerelose) or its equivalent may be added directly to the kettle and with the proportions of ingredients previously specified in this example, about 1600 pounds of cerelose is suitable. It will be understood that instead of brewing sugar, additional sugar value through utilization of more starch cereal products such as grits, rice, etc., may be added during the cooking operation.

*Cooling operation.*—The wort, so prepared is drawn from the kettle and cooled by passing over conventional cooler apparatus, and while in this cooling step, most of the remainder of the withdrawn enzyme-rich infusion liquid (about 70% preferably of total amount) is added to the cooler pan and the wort is cooled preferably to a temperature range between 8 degrees and 10 degrees R. The addition of the large proportion of the infusion liquid at this time is important in that it accomplishes a substantial further breakdown of the various difficultly fermented and otherwise non-fermentable sugars and dextrines, thus finally preparing the wort most efficiently for the succeeding fermentation operations.

*Fermentation operations.*—The said wort, treated by infusion liquid, is taken from the cooler pan and pitched at a temperature between preferably 8 and 10 degrees R., and mixed for fermentation with uncontaminated bottom fermenting yeast (*Saccharomyces cerevisiae*) to the amount of from 44 to 50 gallons at 10% solids content. Fermentation is carried on at a temperature preferably slightly below 13 degrees R., throughout a period from 13 to 16 days. The fermenting temperature, it will be noted, is considerably higher than the average temperature of fermentation of brewery products.

During the fermenting operations in my process, at the end of the 8th or 9th day of fermentation, a small amount (preferably about 6%) of the total amount of infusion liquid withdrawn from the wort, is added, bringing about a more thorough fermentation and utilization of all sugars and fermentable ingredients.

While the precise proportions, temperatures and precise sequence related are not completely restrictive and may vary somewhat in the producing of the desired products, my extensive experience shows that approximately the preceding sequences and steps should be carried out within fairly close limits as to times and temperatures to those previously specified.

The foregoing procedure with the proportions of ingredients and yeast, results in a yield of from 240 to 260 barrels of malt liquor having an alcoholic strength of approximately 6% by weight and having a plato of approximately 0.4%, which product after addition of proper carbon dioxide and including of course, pasteurization, constituted the product of said Patent No. 2,442,806.

My improved process and recent discoveries, as previously recited, require the carrying out of the previously recited steps and the production, first, of the product of said patent, with alcoholic content of at least 6% by weight. This product unexpectedly has permanent flavor characteristics which are so inherent that they carry over to inexpensive extenders which may be provided in my improved process.

Continuing my improved process after said complete fermentation of the brew and finishing thereof in cellar operations and cellar temperatures, I have discovered that a new product of relatively low alcoholic content varying between certain alcoholic percentages by weight and volume may be obtained through certain extender and dilution steps, if properly carried out under my discoveries.

First, I have discovered that contrary to authorities on dilution of naturally fermented malt beverages with the distinctiveness of flavor extract and the formation and production of vinous and malt alcohol which is inherent in the foregoing steps, a homogeneous mixture including dilution by a properly digested brewing water with certain additives will give a truly unexpected and relatively low alcoholic content product having no dangerous qualities as to bacteriology, change of flavor or breakdown or any kind from the time of production.

My discoveries have shown that before carbonization of the said patented product in excess of 6% by weight of alcohol, including fermentation of various sugars and invert sugars which include dextrose sugars as well as sucrose sugars, a homogeneous mixture may be made to lower alcoholic content by adding from a ratio of 7 to 8 down to 3 proportions of a conditioned brewing water previously adjusted to a pH of about 4.3 (preferably by addition of lactic acid, or equivalent) to the original brew which has an alcoholic content of 6.0 by weight or above. Success, I have determined, is only possible through additives which tend to produce enzyme breakdown and which provide some emulsification to the resultant product.

Thus, figuring on the quantities and proportions previously recited or carrying out of the early steps of my method and depending upon the ultimate percentage of alcohol by weight desired in the finished product, I will intimately admix with 160 barrels of said malt liquor produced by the foregoing stems, from 65 to 140 barrels of brewing water adjusted to a pH in the neighborhood of 4.3 and thoroughly admix such adjusted brewing water with the previous high alcoholic content product, while preferably adding extender products or ingredients.

While it is not necessary to thoroughly homogenize the water and extender products with the previously recited wort or brew, it is essential that a homogeneous mixture be arrived at through rapid recirculation of prepared and conditioned brewing water and the original brew in a container or equivalent recirculation.

While this admixture is taking place at cellar temperatures, it is essential, as I have discovered, to add an emulsifier or stabilizer of that class which includes various vegetable gums, guar, Irish moss extractives, gum arabic and mono or diglycerides with such emulsifier, in the proportion by weight of somewhat in the neighborhood of 30 pounds of the emulsifier or water filler to an anticipated ultimate product of 300 barrels. This emulsifier is of course preferably added during the mixing step previously defined so that a very homogeneous ultimate admixture is attained.

I find it also highly desirable and a part of my ultimate process to add a small amount of commercial liquid chillproof during the mixing process, which in most instances, requires only about 2 pounds for an ultimate product of 300 barrels.

Also, I find it desirable although not absolutely necessary, to add a commercial foam builder to the mixture during the mixing step in the neighborhood of about 15 pounds of such a foam builder, such as "Foamade."

Also, it is highly desirable for accentuating malt flavoring to add hop extract in liquid form, approximating 12 pounds thereof, for a 300-barrel output.

If it is desirable to slightly darken the ultimate product, the commercial malt coloring approximating 3 quarts may be (but not necessarily) added during the admixing step.

The mixture and recirculation or stirring of the ingredients is continued until all of the extender additives are thoroughly and homogeneously admixed with the original wort and conditioned brewing water and during such admixture, cellar temperatures are maintained. The time required for completion of said admixing steps will of course vary according to the intensity of mixing or agitation.

Unexpectedly, when the foregoing essential recited steps are carried out and adequate carbonization of the cooled product is provided in the pouring and pasteurization steps ordinarily taking place in breweries and the like, the ultimate product, while varying according to the examples hereinafter set forth, from 3.3 to 5.0 alcoholic strength by weight, will have the inherent and decisive flavoring and taste components of the original high alcoholic product produced by the herein identified patent. The ultimate product, with the extender and mixing steps, has a very pleasurable taste, particularly at cool temperatures, brought about through the unusual simultaneous fermentation of various sugars, invert and complex, including dextrose and sucrose, into a variety of different alcohols which have in combination vinous and malt flavors.

As examples of the production of thin flavorable malt liquors available with my improved process, I set forth the following:

PRODUCTION OF A 3.2% BY WEIGHT THIN MALT LIQUOR

In this instance, starting with a basis of 160 barrels of said high alcoholic content (6% by weight or over) of the patented process I add 140 barrels of preconditioned brewing water at a pH of about 4.3 and begin, at cellar temperatures, the admixing steps. During such thorough admixing, I will add approximately 12 pounds of liquid hop extract; about 30 pounds of the emulsifier utilized in the general class herein suggested (I have found gum arabic is highly successful); I will then add approximately 2 pounds of a liquid chillproof; and about 15 pounds of a commercial foam builder. The mixing steps are carried out to an extent to produce a very homogenous admixture of these ingredients.

When the following steps and proportions are carried out the analysis of the product having an alcoholic content of 3.2 by weight is approximately as follows, as proven by extensive experimentation:

*Example 1*

| | Percent |
|---|---|
| Plato | 0.50 |
| Alcohol by weight | 3.20 |
| Alcohol by volume | 4.0 |
| Real extract | 2.1 |
| Original gravity | 8.4 |
| Protein | 0.21 |

PRODUCTION OF 4% BY WEIGHT MALT LIQUOR

The steps previously recited for the carrying out of my improved process are duplicated and the differential of the somewhat higher alcoholic content is entirely controlled by the proportion of the adjusted brewing water added to the previously prepared high alcoholic content patented product.

For the production of the 4% by weight malt liquor product, I add to about 105 barrels of conditioned brewing water, 195 barrels of the brewed product of the said patent. Here again it is essential that the brewing water added has a pH of 4.3.

Addition of the water at cellar temperatures, the addition of the various extenders, the amounts thereof, and the steps involved are identical with those previously described.

When the steps and proportions are carried out, the analysis of my improved product having an alcoholic content of 4% by weight is as follows:

Example 2

| | Percent |
|---|---|
| Plato | 0.48 |
| Alcohol by weight | 4.0 |
| Alcohol by volume | 5.0 |
| Real extract | 2.40 |
| Original gravity | 10.2 |
| Protein | 0.23 |

PRODUCTION OF 5% BY WEIGHT MALT LIQUOR

Here again the precise steps of my method, addition of extender materials with the exception of prepared brewing water are identical with the processes previously described.

For the production of the 5% by weight product, I add to about 70 barrels of conditioned brewing water at a pH of 4.3, 230 barrels of the previously produced high alcoholic product of the patented process at cellar temperatures. The quantities of the several extender materials and intensity of mixing is carried out as previously described.

The resultant product having an alcoholic content by weight of 5% has been analyzed as follows:

Example 3

| | Percent |
|---|---|
| Plato | 0.45 |
| Alcohol by weight | 5.0 |
| Alcohol by volume | 6.25 |
| Real extract | 2.7 |
| Original gravity | 12.4 |
| Protein | 0.29 |

A totally unexpected result of my exhaustive tests and discoveries has been the finding and thoroughly documented proofs that with extenders the particular type of thin high alcoholic content malt liquor could successfully be thined by addition of prepared brewing water to produce the following, very important results:

(1) To change and lessen the ultimate alcoholic content without dissipation of flavor values, distinctiveness and quality.

(2) To make highly palatable thin malt liquor products having the unusual combination of vinous flavor and the mixture of a number of alcohols fermented from complicated sugars and including dextrose and sucrose very inexpensively.

(3) In connection with preceding No. 2, the cost of production of 3.2% by weight and 4% malt liquors will provide an economic savings in production running from 60% to 85% of the original patented product.

What is claimed is:

1. A method of producing a distinctive malt liquor having an alcoholic content by weight between slightly less than 3.2% and slightly over 5%, and having a saccharometer indication by plato of less than 0.6 which consists in preparing a cooker mash composed of malt cereal products and water, liquefying the starches in said cooker mash, preparing a main mash containing a large percentage of malt with water, first heating said main mash at a temperature favorable to extraction of soluble proteins and then heating the same for a relatively short period of time to a temperature between about 42° and 45° R., withdrawing from said main mash during mashing operation at said temperature range between about 42° and 45° R., a quantity of the thin infusion liquid present which is rich in maltase, diastase and proteinases, to an amount not in excess of ½% of the total volume of the product to be brewed, thereafter, at substantially the end temperature recited, adding the hot cooker mash at boiling temperature to the main mash and thereby raising the temperature of the resultant mash mixture to about 52° R., to saccharify and convert most of the starches and dextrines, drawing off the wort liquid from the mixed mash and boiling the same for several hours and adding hops, then cooling the wort so produced to a temperature of about 9° R. and during said cooling operation, adding at least one half of said withdrawn infusion liquid to cause the infusion enzymes to act upon the dextrines, non-fermentable sugars and difficultly fermentable sugars, fermenting the cooled wort for a total fermentation period of about from 13 to 18 days and adding to the wort during fermentation, a small amount of said withdrawn infusion liquid to materially assist fermentation and breakdown of said difficultly fermentable sugars, then after at least substantially complete fermentation at cellar temperatures, intimately admixing with said fermented brew a proportion of brewing water adjusted to a pH of about 4.3, said proportion of brewing water to fermented wort being within a range of proportions from 7 to 8 and 4 to 8 by volume, and then substantially simultaneously with the said mixing steps, adding to the mixture a small quantity of hop extract, a smaller quantity of liquid chillproof to reduce breakdown of enzymes in the product, a larger amount of weight of commercial foam builder and a larger amount by weight of hops.

2. A method of producing a distinctive malt liquor having an alcoholic content by weight between slightly less than 3.2% and slightly above 5%, and having a saccharometer indication by plato of less than .6% and containing alcohol obtained simultaneously through fermentation of both sucrose and dextrose, which consists in preparing a cooker mash composed of malt cereal products and water to liquefy starches, preparing a main mash containing a large percentage of malt with water, first heating said main mash at a temperature favorable to extraction of soluble proteins and then heating the same for a relatively short time to a temperature between about 42 degrees and 45 degrees R., withdrawing from said main mash near the end of said time and with said mash at said recited temperature range, a quantity of the thin infusion liquid present which is rich in maltase, diastase and proteinases to an amount not in excess of 1% of the total volume of the product to be brewed, thereafter adding the hot cooker mash at boiling temperature to the main mash to saccharify and convert most of the starches and dextrines, drawing off the wort liquid from the mixed mash and boiling the same for several hours with addition of hops, then cooling the wort so produced to a temperature of about 9 degrees R., and while cooling adding at least one half of said withdrawn infusion liquid to cause the enzymes therein to act upon the dextrines, non-fermentable sugars and difficultly fermentable sugars, converting a substantial proportion of the same to fermentable dextrose, fermenting the cooled wort so treated for a total fermentation period of about from 13 to 18 days and adding during fermentation a small amount of the said withdrawn infusion liquid to assist and expedite fermentation and to break down said difficultly fermentable sugars, the product resulting after complete fermentation containing alcohols fermented both from sucrose and dextrose and having an alcoholic content by weight of at least 6% with plato of less than 0.7, then intimately admixing with said product, a proportion of conditioned brewing water adjusted to a pH of about 4.3, said proportion of brewing water to fermented wort being within a range running from three tenths to seven eigths, during the step of admixture of said brewing water and wort, adding a small quantity of an emulsifier of the class which includes binding agents such as vegetable gums, guar, Irish moss, extractives mono and diglycerides, gum arabic and equivalencies, and substantially simultaneously with said previously recited mixing steps adding a small quantity of commercial hop extract and a somewhat larger amount by weight of commercial foam builder, and continuing said mixing step and adding a small quantity of liquid chillproof to reduce breakdown of enzymes in the resultant product.

References Cited
UNITED STATES PATENTS
2,442,806   6/1948   Gluek _____ 99—36

LIONEL M. SHAPIRO, *Primary Examiner.*

A. LOUIS MONACELL, *Examiner.*

D. M. NAFF, *Assistant Examiner.*